United States Patent
Yoshida et al.

(10) Patent No.: US 9,893,397 B2
(45) Date of Patent: Feb. 13, 2018

(54) METAL-AIR CELL

(71) Applicant: Sharp Kabushiki Kaisha, Osaka (JP)

(72) Inventors: Akihito Yoshida, Osaka (JP); Masaki Kaga, Osaka (JP); Tomoharu Arai, Osaka (JP); Hirotaka Mizuhata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 238 days.

(21) Appl. No.: 14/423,879

(22) PCT Filed: Jul. 11, 2013

(86) PCT No.: PCT/JP2013/068940
§ 371 (c)(1),
(2) Date: Feb. 25, 2015

(87) PCT Pub. No.: WO2014/034290
PCT Pub. Date: Mar. 6, 2014

(65) Prior Publication Data
US 2015/0214591 A1    Jul. 30, 2015

(30) Foreign Application Priority Data

Aug. 28, 2012  (JP) ................................. 2012-187850

(51) Int. Cl.
*H01M 4/40* (2006.01)
*H01M 12/06* (2006.01)
(Continued)

(52) U.S. Cl.
CPC ........... *H01M 12/085* (2013.01); *H01M 4/38* (2013.01); *H01M 4/40* (2013.01); *H01M 4/405* (2013.01);
(Continued)

(58) Field of Classification Search
None
See application file for complete search history.

(56) References Cited

U.S. PATENT DOCUMENTS

| | | | |
|---|---|---|---|
| 5,318,861 A * | 6/1994 | Harats ................. | B60L 11/1879 429/142 |
| 2009/0197171 A1* | 8/2009 | Nakazato ............... | H01G 9/016 429/209 |
| 2013/0273442 A1 | 10/2013 | Ogumi et al. | |

FOREIGN PATENT DOCUMENTS

| JP | 07-045270 A | 2/1995 |
|---|---|---|
| JP | 07-192731 A | 7/1995 |
| JP | 2012-099266 A | 5/2012 |

OTHER PUBLICATIONS

International Search Report for corresponding International Application No. PCT/JP2013/068940 dated Sep. 24, 2013.

* cited by examiner

*Primary Examiner* — Jonathan G Leong
*Assistant Examiner* — Christopher Domone
(74) *Attorney, Agent, or Firm* — Renner, Otto, Boisselle & Sklar, LLP

(57) ABSTRACT

The present invention provides a metal-air cell that allows pieces of an electrode active material that have fallen off to contribute to a discharge reaction and thus has high power generation efficiency.

The metal-air cell according to the present invention includes an electrolyte cell containing an electrolyte, a metal electrode disposed in the electrolyte cell and serving as an anode, and an air electrode serving as a cathode. The metal electrode includes a current collector and an electrode active material part disposed on the current collector and made of an electrode active material. The current collector includes a supporting part supporting the electrode active material (Continued)

part and a receiving part disposed between a bottom of the electrolyte cell and the electrode active material part. The receiving part includes a projection projecting in the electrolyte cell beyond a side surface of the electrode active material part toward a sidewall of the electrolyte cell.

13 Claims, 5 Drawing Sheets

(51) Int. Cl.
*H01M 4/42* (2006.01)
*H01M 12/08* (2006.01)
*H01M 4/70* (2006.01)
*H01M 4/46* (2006.01)
*H01M 4/90* (2006.01)
*H01M 4/38* (2006.01)
*H01M 4/66* (2006.01)
*H01M 4/74* (2006.01)

(52) U.S. Cl.
CPC ............... *H01M 4/42* (2013.01); *H01M 4/46* (2013.01); *H01M 4/661* (2013.01); *H01M 4/70* (2013.01); *H01M 4/74* (2013.01); *H01M 4/9041* (2013.01); *H01M 12/06* (2013.01); *H01M 12/08* (2013.01); *Y02E 60/128* (2013.01)

METAL-AIR CELL

TECHNICAL FIELD

The present invention relates to metal-air cells.

BACKGROUND ART

Metal-air cells, which include a metal electrode serving as an anode and containing an electrode active material made of a metal and an air electrode serving as a cathode, are gaining attention as next-generation cells because of their high energy density.

When a metal-air cell is used as a secondary cell, dendrites may grow from the metal electrode toward the air electrode and thus cause a short circuit in the cell during charge. Accordingly, a system has been proposed that uses a metal-air cell as a primary cell and that produces an electrode active material made of a metal by reducing by-products such as metal oxides and supplies the electrode active material to the metal-air cell (see, for example, PTL 1).

Among metal-air cells for use as primary cells are zinc-air cells. FIG. 7 is a schematic sectional view illustrating the discharge reaction of a zinc-air cell. As shown in FIG. 7, the zinc-air cell includes a zinc electrode 101 disposed in an alkaline electrolyte 103 and containing metallic zinc, which serves as an electrode active material, and an air electrode 105 disposed on an anion exchange membrane 106 in contact with the electrolyte 103. As the discharge reaction proceeds, the zinc-air cell outputs electric power through the zinc electrode 101 and the air electrode 105. The air electrode 105 is typically an air electrode catalyst supported on a carbon support.

In the discharge reaction of the zinc-air cell, the metallic zinc in the zinc electrode 101 reacts with hydroxide ions in the alkaline electrolyte 103 to form tetrahydroxozincate(II) ions while releasing electrons into the zinc electrode 101. The tetrahydroxozincate(II) ions then dehydrate and precipitate in the form of zinc hydroxide or zinc oxide in the electrolyte. The air electrode 105 allows electrons, water, and oxygen to react and form hydroxide ions. These hydroxide ions move through the anion exchange membrane 106 into the alkaline electrolyte 103. Because the metallic zinc in the zinc electrode 101 is consumed as the discharge reaction proceeds, the zinc-air cell is supplied with metallic zinc, which serves as an electrode active material.

CITATION LIST

Patent Literature

PTL 1: Japanese Unexamined Patent Application Publication No. 7-45270

SUMMARY OF INVENTION

Technical Problem

As a discharge reaction proceeds in a conventional metal-air cell, pieces of the metal serving as the electrode active material may fall off the metal electrode. These pieces that have fallen off cannot contribute to the discharge reaction because no electric charge can move from the pieces into the metal electrode. This decreases the power generation efficiency of the metal-air cell.

In view of the foregoing background, the present invention provides a metal-air cell that allows pieces of an electrode active material that have fallen off to contribute to a discharge reaction and thus has high power generation efficiency.

Solution to Problem

The present invention provides a metal-air cell including an electrolyte cell containing an electrolyte, a metal electrode disposed in the electrolyte cell and serving as an anode, and an air electrode serving as a cathode. The metal electrode includes a current collector and an electrode active material part disposed on the current collector and made of an electrode active material. The current collector includes a supporting part supporting the electrode active material part and a receiving part disposed between a bottom of the electrolyte cell and the electrode active material part. The receiving part includes a projection projecting in the electrolyte cell beyond a side surface of the electrode active material part toward a sidewall of the electrolyte cell.

Advantageous Effects of Invention

According to the present invention, the metal-air cell, which includes the electrolyte cell containing the electrolyte, the metal electrode disposed in the electrolyte cell and serving as the anode, and the air electrode serving as the cathode, can output electric power through the metal electrode and the air electrode.

According to the present invention, the metal electrode, which includes the current collector and the electrode active material part disposed on the current collector and made of an electrode active material, can collect electric charge generated by an electrode reaction through the current collector.

According to the present invention, the current collector, which includes the supporting part supporting the electrode active material part, can inhibit the collapse of the electrode active material part when the electrode reaction proceeds and consumes the electrode active material.

According to the present invention, the current collector includes the receiving part disposed between the bottom of the electrolyte reservoir and the electrode active material part, and the receiving part includes the projection projecting in the electrolyte cell beyond the side surface of the electrode active material part toward the sidewall of the electrolyte cell; therefore, when the electrode reaction proceeds and consumes the electrode active material, pieces of the electrode active material fall off the electrode active material part onto the projection of the receiving part and can be electrically connected to the receiving part. Thus, the electrode reaction can proceed on the pieces of the electrode active material that have fallen off, and the electric charge generated by the electrode reaction can be collected through the receiving part. This allows the pieces of the electrode active material that have fallen off to be utilized for the discharge reaction, thus improving the power generation efficiency of the metal-air cell.

DESCRIPTION OF EMBODIMENTS

Figure 1:
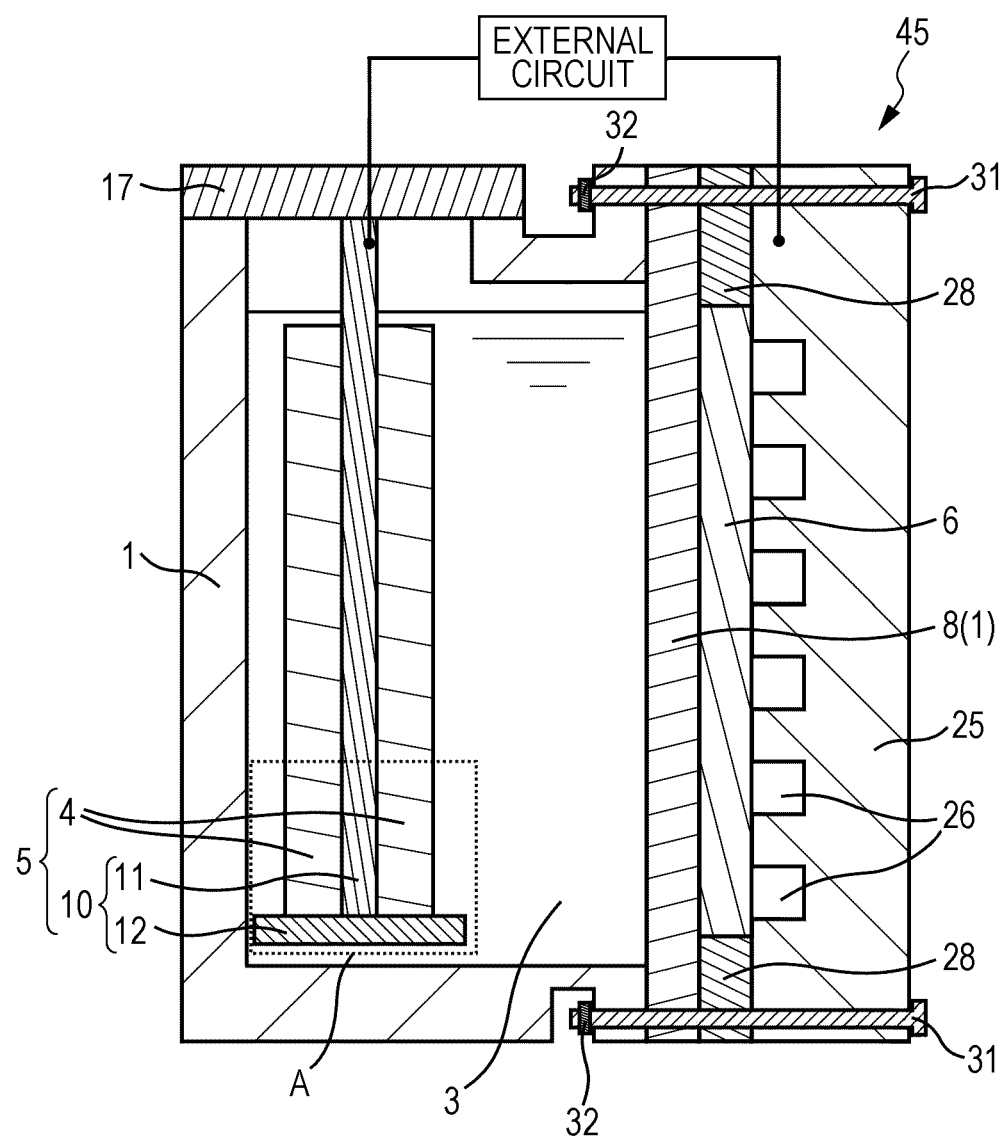
FIG. 1 is a schematic sectional view illustrating the structure of a metal-air cell according to an embodiment of the present invention.

A metal-air cell according to the present invention includes an electrolyte cell containing an electrolyte, a metal electrode disposed in the electrolyte cell and serving as an anode, and an air electrode serving as a cathode. The metal electrode includes a current collector and an electrode active material part disposed on the current collector and made of an electrode active material. The current collector includes a supporting part supporting the electrode active material part and a receiving part disposed between a bottom of the electrolyte cell and the electrode active material part. The receiving part includes a projection projecting in the electrolyte cell beyond a side surface of the electrode active material part toward a sidewall of the electrolyte cell.

In the metal-air cell according to the present invention, the receiving part is preferably provided such that the projection receives a piece of the electrode active material falling off the electrode active material part.

With this structure, the piece of the electrode active material that has fallen off can be utilized for the discharge reaction, thus improving the power generation efficiency of the metal-air cell.

In the metal-air cell according to the present invention, the supporting part is preferably plate-shaped and has an end joined to the receiving part.

With this structure, the electrode active material part can be supported on the main surfaces of the plate-shaped supporting part, and the receiving part can be disposed between the electrode active material part and the bottom of the electrolyte cell. The receiving part can also reduce the risk of damage to the electrode active material part when the metal electrode is inserted into the electrolyte cell.

In the metal-air cell according to the present invention, the supporting part is preferably plate-shaped and has an end detachably attached to the receiving part.

With this structure, the metal electrode can be transported and stored with the receiving part detached therefrom to efficiently transport and store the electrode active material. The electrode active material can also be electrodeposited on the supporting part before the attachment of the receiving part to the supporting part to easily fabricate the metal electrode for the metal-air cell according to the present invention.

In the metal-air cell according to the present invention, the receiving part is preferably fixed to the electrolyte cell.

With this structure, the step of attaching the receiving part to the supporting part and the step of inserting the metal electrode into the electrolyte cell can be simultaneously performed, thus reducing the number of steps and the cost.

In the metal-air cell according to the present invention, the receiving part is preferably provided so as to accommodate a piece of the electrode active material falling off the electrode active material part.

With this structure, pieces of the electrode active material that have fallen on the projection can be accommodated in the receiving part, and more pieces of the electrode active material can be electrically connected to the receiving part. This allows more pieces of the electrode active material that have fallen off to be utilized for the discharge reaction, thus improving the power generation efficiency of the metal-air cell.

In the metal-air cell according to the present invention, the supporting part is preferably plate-shaped, and the electrode active material part is preferably disposed on first and second main surfaces of the supporting part.

With this structure, a larger amount of electrode active material can be supported on the supporting part, and accordingly a larger amount of electrode active material can be incorporated into the metal electrode. The distance between the surface of the electrode active material part where the electrode reaction proceeds and the supporting part can also be reduced so that the electric charge generated by the electrode reaction can be efficiently collected.

In the metal-air cell according to the present invention, the supporting part and the receiving part are preferably made of a plate-shaped member.

With this structure, the receiving part can be easily formed in the metal electrode.

In the metal-air cell according to the present invention, the supporting part and the receiving part are preferably each made of a metal plate.

With this structure, the current collector including the supporting part and the receiving part can be easily fabricated.

In the metal-air cell according to the present invention, the supporting part is preferably made of a metal plate, and the receiving part is preferably made of a metal mesh.

With this structure, smaller particles fall through gaps in the receiving part onto the bottom of the electrolyte cell, whereas larger pieces of the electrode active material can be electrically connected to the receiving part. This allows the electrode active material that has fallen off the electrode active material part to be efficiently utilized for the electrode reaction on the receiving part.

In the metal-air cell according to the present invention, the electrode active material is preferably metallic zinc, metallic calcium, metallic magnesium, metallic aluminum, metallic iron, metallic lithium, or metallic sodium.

With this structure, the metal that forms the electrode active material part can be used as an electrode active material for the metal-air cell.

In the metal-air cell according to the present invention, the metal electrode is preferably provided so as to be insertable into and removable from the electrolyte cell.

With this structure, a spent metal electrode depleted of the electrode active material can be removed from the electrolyte cell, and a fresh metal electrode can be inserted into the electrolyte cell to supply the electrode active material to the metal-air cell.

The metal-air cell according to the present invention preferably further includes an ion exchange membrane disposed between the metal electrode and the air electrode. The ion exchange membrane preferably has a main surface in contact with the electrolyte contained in the electrolyte cell and another main surface in contact with the air electrode.

With this structure, the type of ion that moves between the air electrode and the electrolyte can be limited to reduce precipitation of metals and carbonates on the air electrode.

An embodiment of the present invention will now be described with reference to the drawings. The structures illustrated in the drawings and the following description are for illustrative purposes only and are not intended to limit the scope of the present invention.

Structure of Metal-Air Cell

Figure 2:
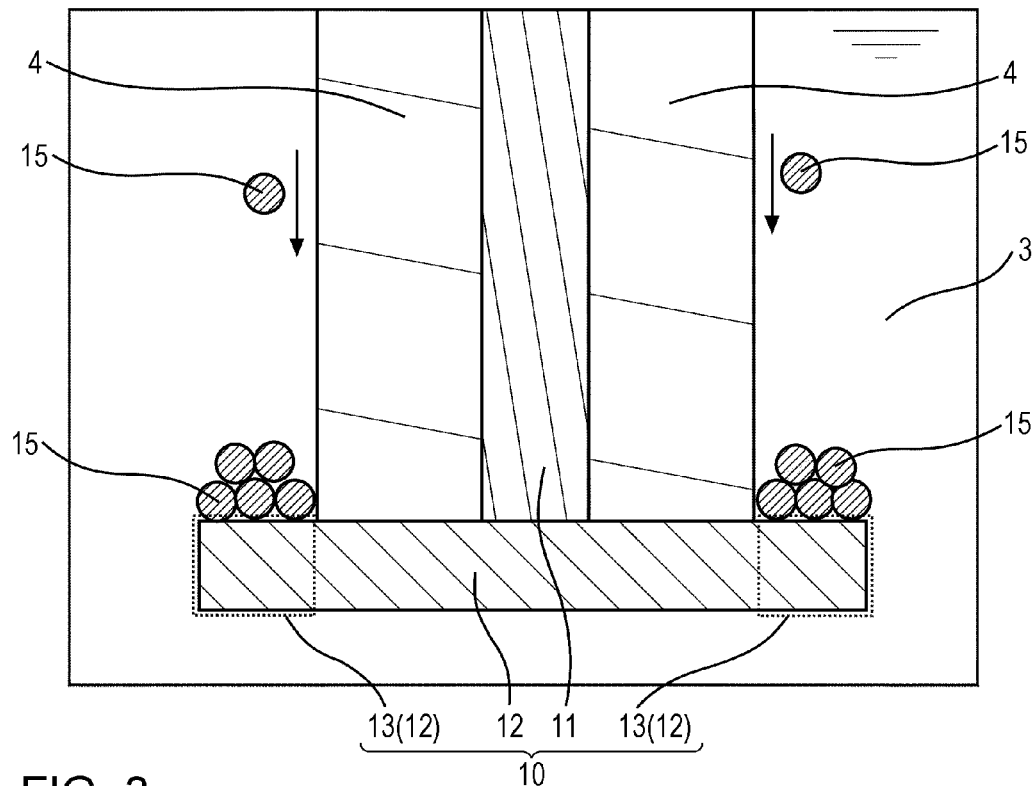
FIG. 2 is a schematic sectional view of the metal-air cell in FIG. 1, showing the area A enclosed by the dotted line.
Figure 5:
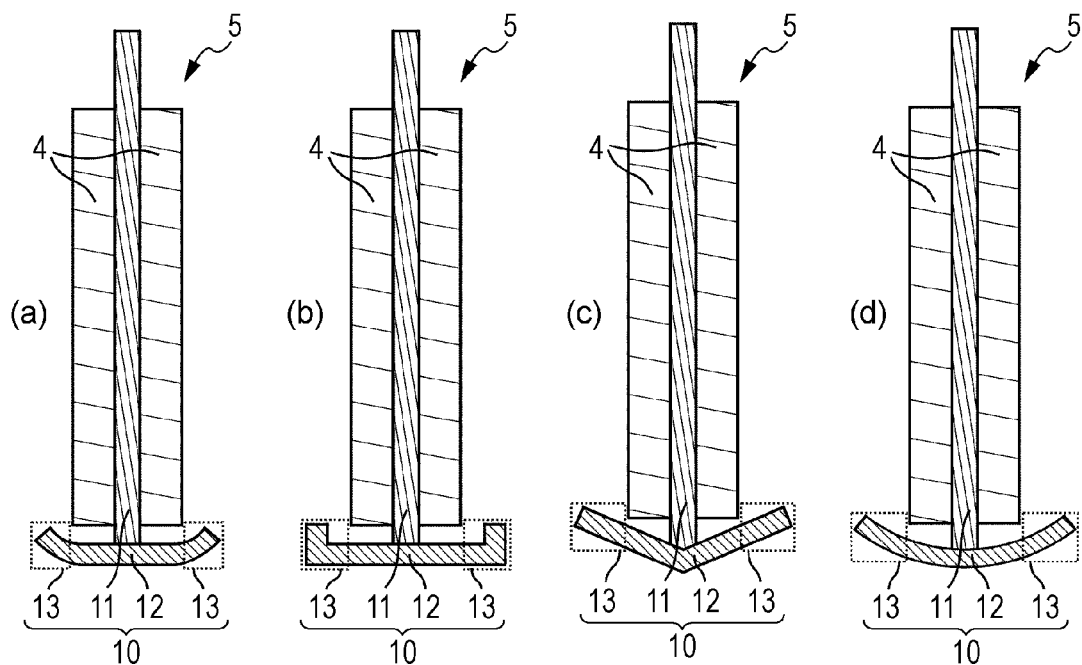
FIGS. 5(a) to 5(d) are schematic sectional views of metal electrodes for the metal-air cell according to the embodiment of the present invention.
Figure 6:
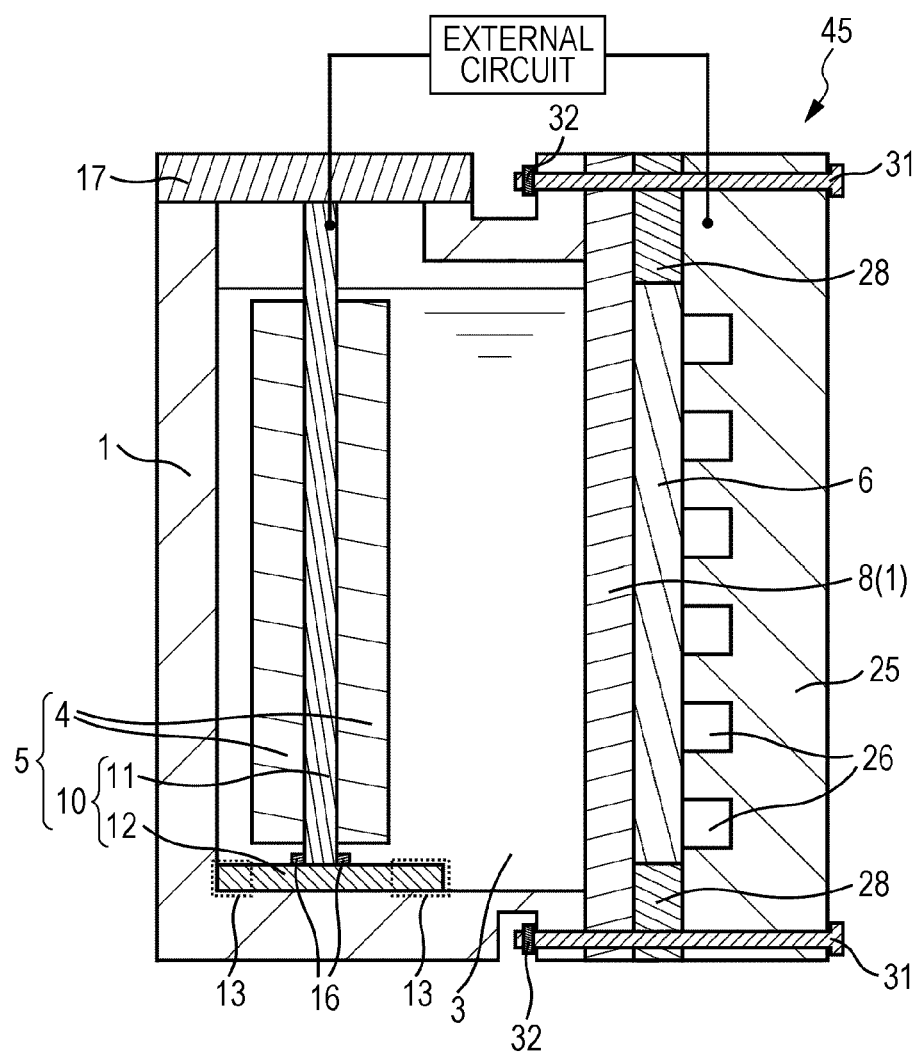
FIG. 6 is a schematic sectional view illustrating the structure of a metal-air cell according to the embodiment of the present invention.
Figure 7:
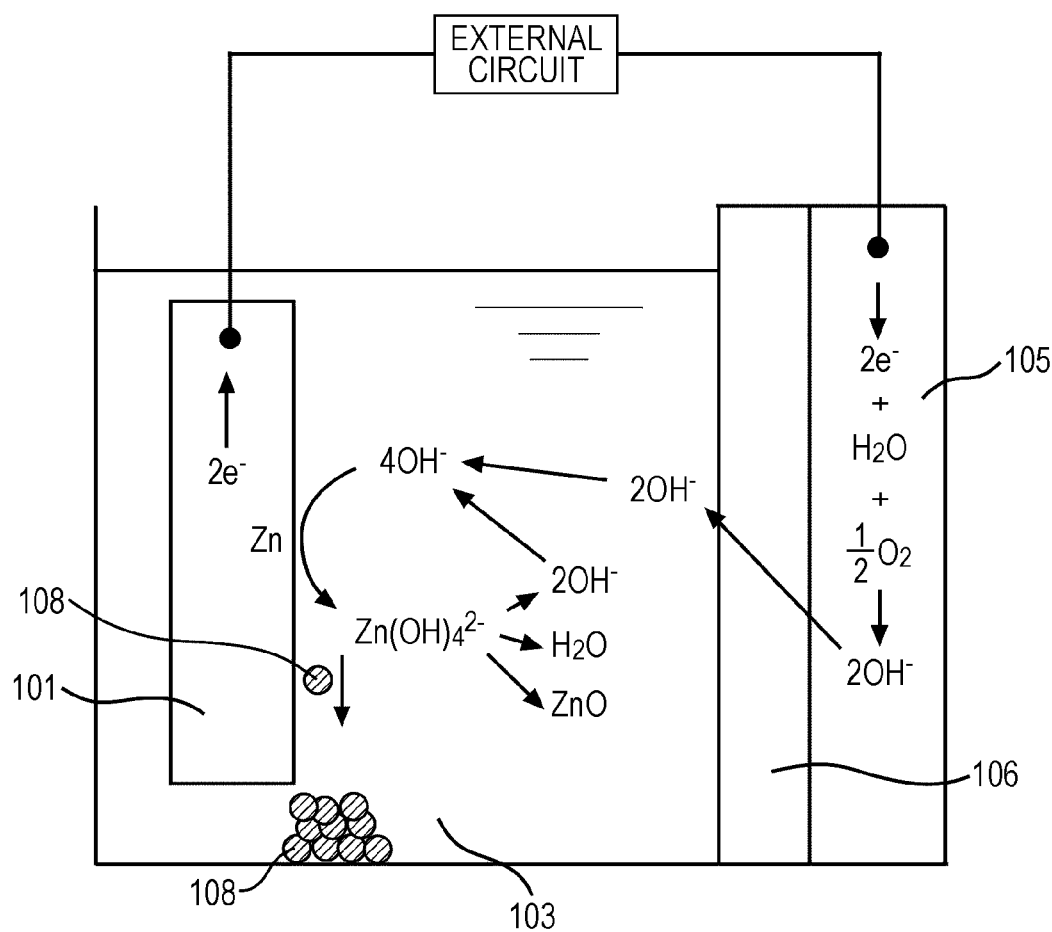
FIG. 7 is a schematic sectional view illustrating the discharge reaction of a zinc-air cell.

FIGS. 1 and 6 are schematic sectional views illustrating the structures of metal-air cells according to this embodiment, and FIG. 2 is a schematic sectional view of the metal-air cell in FIG. 1, showing the area A enclosed by the dotted line. FIG. 2 schematically illustrates pieces 15 of an electrode active material falling off an electrode active material part 4 as a discharge reaction proceeds. FIGS. 3(a) to 3(c), 4(a) and 4(b), and 5(a) to 5(d) are schematic sectional views of metal electrodes for the metal-air cell according to this embodiment.

A metal-air cell 45 according to this embodiment includes an electrolyte cell 1 containing an electrolyte 3, a metal electrode 5 disposed in the electrolyte cell 1 and serving as an anode, and an air electrode 6 serving as a cathode. The metal electrode 5 includes a current collector 10 and an electrode active material part 4 disposed on the current collector 10 and made of an electrode active material. The current collector 10 includes a supporting part 11 supporting the electrode active material part 4 and a receiving part 12 disposed between the bottom of the electrolyte cell 1 and the electrode active material part 4. The receiving part 12 includes projections 13 projecting in the electrolyte cell 1 beyond the side surfaces of the electrode active material part 4 toward the sidewalls of the electrolyte cell 1.

The metal-air cell 45 according to this embodiment will now be described.

1. Metal-Air Cell

The metal-air cell 45 according to this embodiment includes the metal electrode 5 serving as the negative electrode (anode) and the air electrode 6 serving as the positive electrode (cathode). For example, the metal-air cell 45 according to this embodiment may be a zinc-air cell, a lithium-air cell, a sodium-air cell, a calcium-air cell, a magnesium-air cell, an aluminum-air cell, or an iron-air cell. The metal-air cell 45 according to this embodiment may be either a primary cell or a secondary cell, preferably a primary cell. The use of the metal-air cell 45 according to this embodiment as a primary cell does not result in growth of dendrites from the metal electrode 5 toward the air electrode 6, which is a problem associated with secondary cells, thus reducing the risk of a short circuit between the metal electrode 5 and the air electrode 6.

2. Electrolyte Cell and Electrolyte Solution

The electrolyte cell 1 contains the electrolyte 3 and is made of a material resistant to corrosion in electrolytes. The electrolyte cell 1 is configured such that the metal electrode 5 can be mounted therein. The electrolyte cell 1 is also configured such that ions present in the electrolyte 3 contained therein can move to the air electrode 6. This allows the ions to move between the metal electrode 5 and the air electrode 6 through the electrolyte solution 3 contained in the electrolyte cell 1. An ion exchange membrane 8 may form part of an inner wall of the electrolyte cell 1. This allows the ions present in the electrolyte 3 to move to the air electrode 6 through the ion exchange membrane 8.

The electrolyte 3 is an ionically conductive liquid containing a solvent and an electrolyte dissolved therein. The electrolyte 3 may be an electrolyte containing water (aqueous electrolyte) or an electrolyte containing an organic solvent (organic electrolyte), depending on the type of metal that forms the electrode active material part 4.

For example, alkaline aqueous solutions such as aqueous sodium hydroxide solution and aqueous potassium hydroxide solution and nearly neutral electrolytes such as aqueous sodium chloride solution can be used in zinc-air cells, aluminum-air cells, iron-air cells, and magnesium-air cells. Organic electrolytes can be used in lithium-metal cells, sodium-air cells, and calcium-air cells.

Alternatively, the electrolyte cell 1 may include a partition made of a solid electrolyte and may contain an aqueous electrolyte on one side of the partition and an organic electrolyte on the other side of the partition.

3. Metal Electrode

The metal electrode 5 is disposed in the electrolyte cell 1 and serves as the anode of the metal-air cell 45. The metal electrode 5 includes the current collector 10 and the electrode active material part 4. The electrode active material part 4 is disposed on the current collector 10 and is made of a metal serving as an electrode active material.

With this structure, the electrolyte 3 contained in the electrolyte cell 1 can be brought into contact with the surface of the electrode active material part 4 so that an electrode reaction can proceed on the surface of the electrode active material part 4. During the electrode reaction, the metal serving as the electrode active material that forms the electrode active material part 4 is consumed, and the electrode active material part 4 becomes gradually smaller. The electric charge generated by the electrode reaction is collected through the current collector 10 and flows to an external circuit.

Figure 3:
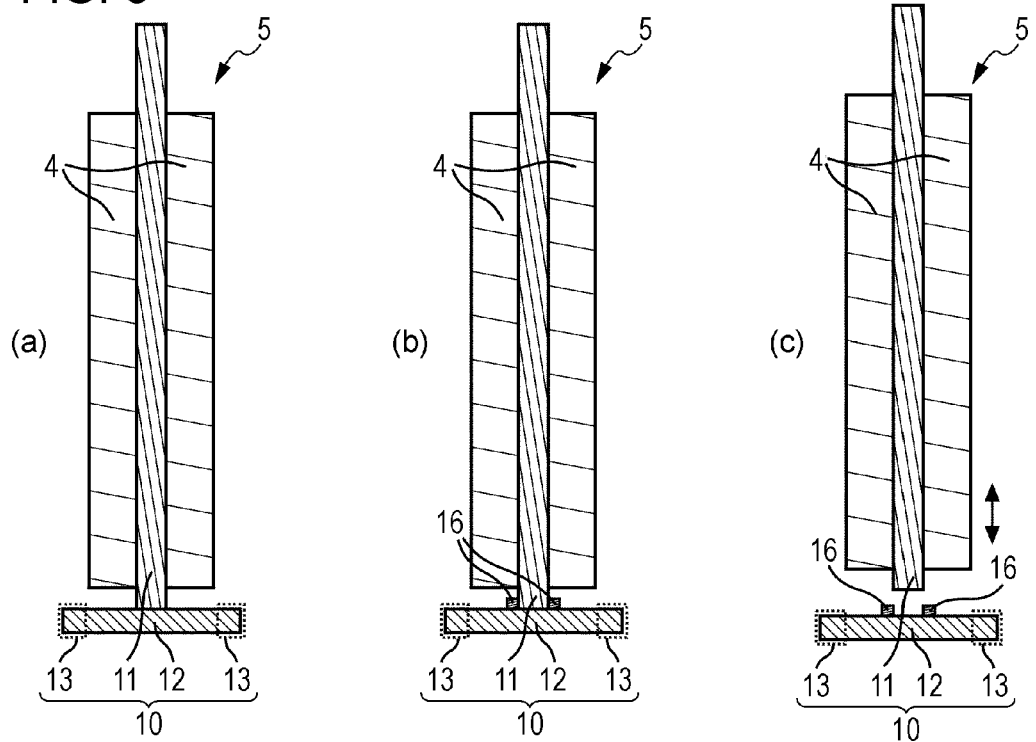
FIGS. 3(a) to 3(c) are schematic sectional views of metal electrodes for the metal-air cell according to the embodiment of the present invention.
Figure 4:
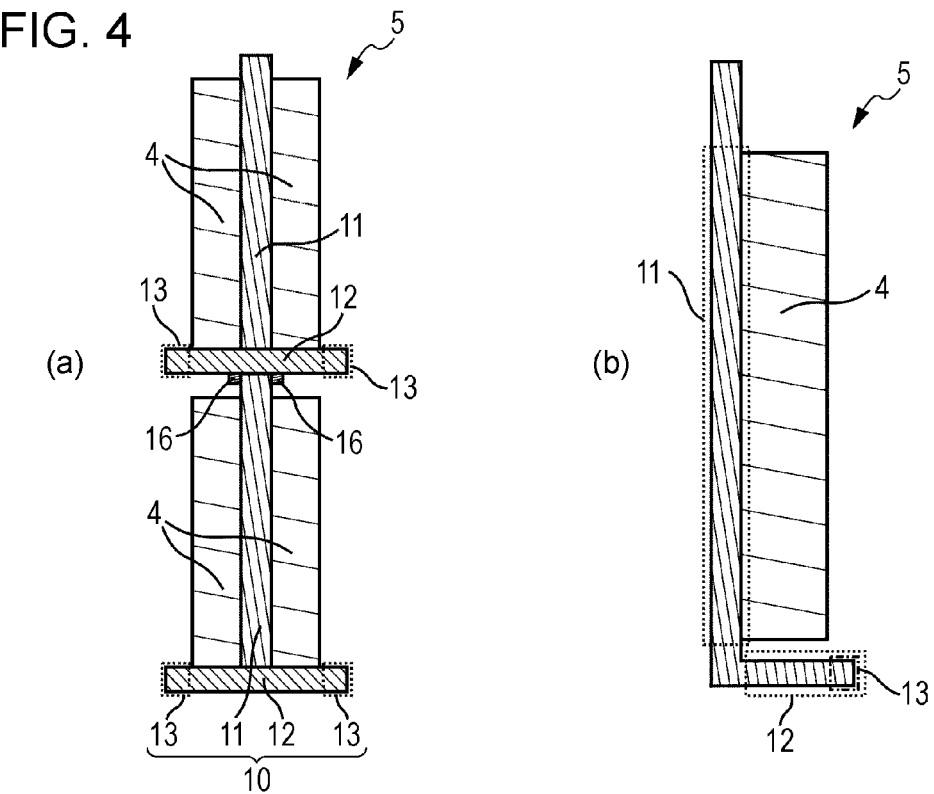
FIGS. 4(a) and 4(b) are schematic sectional views of metal electrodes for the metal-air cell according to the embodiment of the present invention.

When the metal-air cell 45 shown in FIG. 1 or 6 generates electricity, an electrode reaction proceeds on each of the metal electrode 5 and the air electrode 6. The metal electrode 5 becomes spent after the electrode reaction on the metal electrode 5 consumes much metal that forms the electrode active material part 4. The spent metal electrode 5 is detached from the metal-air cell body together with a lid member 17 and is removed from the electrolyte cell 1. For the metal-air cell 45 shown in FIG. 6, the supporting part 11 is detached from the receiving part 12. The spent metal electrode 5 is then detached from the lid member 17, and a fresh metal electrode 5 like those shown in FIGS. 3 to 5 is attached to the lid member 17. This metal electrode 5 is inserted into the electrolyte cell 1 to incorporate the metal electrode 5 and the lid member 17 into the metal-air cell body. For the metal-air cell 45 shown in FIG. 6, the supporting part 11 is attached to the receiving part 12. In this way, a spent metal electrode 5 can be replaced with a fresh metal electrode 5 to supply the metal serving as the electrode active material to the metal-air cell 45.

As the electrode reaction proceeds on the surface of the electrode active material part 4, pieces 15 of the metal serving as the electrode active material may fall off the electrode active material part 4. One possible cause of the fall-off of the pieces 15 is the variation in the rate at which the electrode reaction proceeds in the reaction surface of the electrode active material part 4. If the electrode reaction proceeds at varying rates, the metal is consumed at a higher rate in the region where the electrode reaction proceeds at a higher rate and is consumed at a lower rate in the region where the electrode reaction proceeds at a lower rate. The consumption of the metal in the region where the metal is consumed at a higher rate causes the metal to come off the electrode active material part 4 in the region where the metal is consumed at a lower rate, with the result that the metal pieces 15 fall off the electrode active material part 4.

Possible causes of the variation in the rate at which the electrode reaction proceeds are as follows. First, the distance between the surface of the current collector 10 and the surface of the electrode active material part 4 may vary in the reaction surface, which results in variations in the rate at which the electrode reaction proceeds in the region where the electric charge generated by the electrode reaction is more easily collected and the region where the electric charge is less easily collected. Second, there may be a temperature distribution in the surface of the electrode active material part 4, which results in variations in the rate at which the electrode reaction proceeds in the region where the temperature is higher and the region where the temperature is lower. Third, the electrolyte in contact with the surface of the electrode active material part 4 may have varying electrolyte concentrations, which result in variations in the rate at which the electrode reaction proceeds. Fourth, the structure of the metal that forms the electrode active material part 4 may include regions of different compositions, grain boundaries, or fine irregularities, which result in variations in the rate at which the electrode reaction proceeds.

The electrode active material part 4 is made of a metal serving as an electrode active material for the metal-air cell 45. For example, if the metal-air cell 45 is a zinc-air cell, the electrode active material part 4 is made of metallic zinc. If the metal-air cell 45 is an aluminum-air cell, the electrode active material part 4 is made of metallic aluminum. If the metal-air cell 45 is an iron-air cell, the electrode active material part 4 is made of metallic iron. If the metal-air cell 45 is a magnesium-air cell, the electrode active material part 4 is made of metallic magnesium.

If the metal-air cell 45 is a lithium-metal cell, a sodium-air cell, or a calcium-air cell, the metal electrode 5 is made of metallic lithium, metallic sodium, or metallic calcium, respectively.

Although the electrode active material part 4 is made of an elemental metal in the above examples, the electrode active material part 4 may be made of an alloy.

The metal that forms the electrode active material part 4 is manufactured, for example, by refining a material such as ore or by reducing a metal oxide through a wet or dry process. If the metal serving as the electrode active material is manufactured by electrodeposition, the metal may be electrodeposited on the current collector 10. In this case, the metal electrode 5 can be fabricated by depositing the metal on the surface of the supporting part 11 and then attaching the receiving part 12 to the supporting part 11.

The electrode active material part 4 may be a metal layer electrodeposited on the current collector 10, a metal solid formed by drying a metal slurry, or a metal compact formed by compressing a powdered metal.

For example, the metal can be electrodeposited on the supporting part 11 of the current collector 10 by immersing the supporting part 11, which serves as a cathode, in an electrolyte containing metal ions serving as an electrolyte and applying a voltage between the anode and the cathode.

The current collector 10 collects the electric charge generated by the electrode active material part 4. The current collector 10 includes the supporting part 11 supporting the electrode active material part 4 and the receiving part 12 disposed between the bottom of the electrolyte cell 1 and the electrode active material part 4. The supporting part 11 and the receiving part 12 are electrically connected together. The current collector 10 is made of a conductive material resistant to corrosion in electrolytes.

The supporting part 11 is conductive and supports the electrode active material part 4, with the electrode active material part 4 disposed on the surface of the supporting part 11. The supporting part 11 may be plate-shaped. For example, the supporting part 11 may be made of a plate of a metal such as stainless steel or nickel or a mesh of a metal such as stainless steel or nickel. The supporting part 11 can inhibit the collapse of the electrode active material part 4 when the electrode reaction proceeds and consumes the metal serving as the electrode active material.

If the supporting part 11 is plate-shaped, the electrode active material part 4 can be disposed on first and second main surfaces of the supporting part 11. This allows a larger amount of electrode active material to be present in the metal electrode 5. Such a metal electrode 5, when incorporated into the metal-air cell 45, can supply a larger amount of electrode active material to the metal-air cell 45.

The electrode active material part 4 can be provided such that the surface thereof is substantially parallel to the surface of the supporting part 11. This reduces the region where the electric charge generated by the electrode reaction is more easily collected and the region where the electric charge is less easily collected on the surface of the electrode active material part 4.

The receiving part 12 of the current collector 10 is disposed between the bottom of the electrolyte cell 1 and the electrode active material part 4 and includes the projections 13 projecting in the electrolyte cell 1 beyond the side surfaces of the electrode active material part 4 toward the sidewalls of the electrolyte cell 1. The receiving part 12 is also conductive. Because the current collector 10 includes the receiving part 12, the metal pieces 15 fall off the electrode active material part 4 onto the projections 13 as the electrode reaction proceeds. Thus, electric charge can be collected from the metal pieces 15 through the receiving part 12, and the electrode reaction can proceed on the surfaces of the metal pieces 15. This allows the metal pieces 15 to be utilized for the discharge reaction of the metal-air cell, thus improving the power generation efficiency of the metal-air cell 45.

The receiving part 12 of the current collector 10 can be provided so as to receive the pieces 15 of the electrode active material falling off the electrode active material part 4.

For example, if the metal-air cell 45 is configured as shown in FIGS. 1 and 2, the electrode reaction proceeds on the side surfaces of the electrode active material part 4, which are in contact with the electrolyte 3. As the electrode reaction proceeds on the side surfaces of the electrode active material part 4, the metal serving as the electrode active material is gradually consumed, and the electrode active material part 4 becomes gradually thinner. As more metal is consumed, more metal pieces 15 fall off the side surfaces of the electrode active material part 4. These metal pieces 15 fall onto the projections 13 of the receiving part 12 and are electrically connected to the receiving part 12. This allows the electrode reaction to proceed on the surfaces of the pieces 15 and thus allows the electric charge generated by the electrode reaction to be collected through the receiving part 12.

The receiving part 12 may be either a plate or a mesh that can receive the pieces 15 of the electrode active material falling off the electrode active material part 4. For example, the receiving part 12 may be made of a plate of a metal such as stainless steel or nickel or a mesh of a metal such as stainless steel or nickel.

If both the supporting part 11 and the receiving part 12 are made of a metal plate, the supporting part 11 and the receiving part 12 may be formed by bending a metal plate, as the metal electrode 5 shown in FIG. 4(b).

The current collector 5 can be configured such that the receiving part 12 is joined to an end of the supporting part 11. This facilitates placement of the receiving part 12 between the bottom of the electrolyte cell 1 and the electrode active material part 4.

The electrode active material part 4 may be provided so as to be supported by both the supporting part 11 and the receiving part 12, as shown in FIGS. 1, 2, and 4(*a*), or may be provided so as to be supported only by the supporting part 11. If the electrode active material part 4 is provided so as to be supported by both the supporting part 11 and the receiving part 12, the electrode active material part 4 is less likely to fall off the supporting part 11. If the electrode active material part 4 is provided so as to be supported only by the supporting part 11, the receiving part 12 can receive more metal pieces 15, thus improving the power generation efficiency of the metal-air cell 45.

For example, the end of the supporting part 11 may be joined to the receiving part 12, as shown in FIGS. 1, 3(*a*), and 4(*a*), or may be detachably provided on the receiving part 12, as shown in FIGS. 3(*b*) and 3(*c*). FIG. 3(*b*) is a sectional view of the metal electrode 5, with the supporting part 11 attached to the receiving part 12 with a fitting member 16, and FIG. 3(*c*) is a sectional view of the metal electrode 5, with the supporting part 11 detached from the receiving part 12. Although the supporting part 11 is detachably provided on the receiving part 12 in this example, the receiving part 12 may instead be detachably provided on the supporting part 11.

For example, as shown in FIG. 6, the receiving part 12 may be provided such that the receiving part 12 is fixed in the electrolyte cell 1 and the end of the supporting part 11 is attached to the receiving part 12 when the supporting part 11 is inserted into the electrolyte cell 1.

If the receiving part 12 is attached to the supporting part 11 before the metal electrode 5 is inserted into the electrolyte cell 1, the receiving part 12 can reduce the risk of damage to the electrode active material part 4 due to contact with the electrolyte cell 1.

The receiving part 12 may be provided so as to accommodate the pieces 15 of the electrode active material falling off the electrode active material part 4. For example, the projections 13 of the receiving part 12 may be inclined with respect to the remaining portion, as shown in FIG. 5(*a*), may include sidewalls, as shown in FIG. 5(*b*), may be V-shaped, as shown in FIG. 5(*c*), or may be arc-shaped, as shown in FIG. 5(*d*). If the receiving part 12 is configured as described above, the receiving part 12 can accommodate the pieces 15 of the electrode active material that have fallen on the projections 13, and more pieces 15 can be electrically connected to the receiving part 12. This further improves the power generation efficiency of the metal-air cell 45.

The metal electrode 5 may include a plurality of receiving parts 12. This allows the receiving parts 12 to receive more metal pieces 15, thus improving the power generation efficiency of the metal-air cell 45. For example, the metal electrode 5 may include alternately stacked receiving parts 12 and electrode active material parts 4, as shown in FIG. 4(*a*).

4. Air Electrode and Ion Exchange Membrane

The air electrode 6 generates hydroxide ions (OH⁻) from oxygen gas in air, water, and electrons. The air electrode 6 includes, for example, a conductive porous support and an air electrode catalyst supported thereon. This allows oxygen gas, water, and electrons to coexist on the air electrode catalyst so that the electrode reaction can proceed. The water used in the electrode reaction may be supplied from air or may be supplied from the electrolyte.

Examples of porous supports include carbon blacks such as acetylene black, furnace black, channel black, and Ketjen Black and conductive carbon particles such as graphite and activated carbon. Carbon fibers such as vapor-grown carbon fibers (VGCF), carbon nanotubes, and carbon nanowires can also be used.

Examples of air electrode catalysts include fine particles of platinum, iron, cobalt, nickel, palladium, silver, ruthenium, iridium, molybdenum, manganese, compounds of these metals, and alloys containing at least two of these metals. Preferred examples of alloys include those containing at least two of platinum, iron, cobalt, and nickel, such as platinum-iron alloys, platinum-cobalt alloys, iron-cobalt alloys, cobalt-nickel alloys, iron-nickel alloys, and iron-cobalt-nickel alloys.

The porous support for the air electrode 6 may be surface-treated such that cationic groups are present as fixed ions on the surface thereof. This allows hydroxide ions to move through the surface of the porous support, thus increasing the mobility of the hydroxide ions generated on the air electrode catalyst.

The air electrode 6 may include an anion exchange resin supported on the porous support. This allows hydroxide ions to move through the anion exchange resin, thus increasing the mobility of the hydroxide ions generated on the air electrode catalyst.

The air electrode 6 may be disposed in direct contact with air or may be disposed in contact with air channels 26. This allows oxygen gas to be supplied to the air electrode 6. If the air channels 26 are provided, moist air can be supplied to the air channels 26 to supply water as well as oxygen gas to the air electrode 6. The air channels 26 can be provided, for example, in a current-collecting member 25 of the metal-air cell 45 shown in FIG. 1 or 6. This allows the air channels 26 to be defined and also allows the air electrode 6 to be connected to an external circuit through the current-collecting member 25 to output electric power from the metal-air cell 45 to the external circuit. The surface of the air electrode may be treated with a water-repellent finish so that no electrolyte solution leaks outside through the air electrode.

The air electrode 6 may be disposed in contact with the electrolyte 3 contained in the electrolyte cell 1. This allows the hydroxide ions generated by the air electrode 6 to move easily into the electrolyte 3 and also allows the water necessary for the electrode reaction on the air electrode 6 to be easily supplied from the electrolyte 3 to the air electrode 6.

The air electrode 6 may be disposed in contact with the ion exchange membrane 8 in contact with the electrolyte 3 contained in the electrolyte cell 1. The ion exchange membrane 8 may be an anion exchange membrane. This allows the hydroxide ions generated by the air electrode 6 to move through the anion exchange membrane into the electrolyte.

The ion exchange membrane 8 can limit the type of ion that moves between the air electrode 6 and the electrolyte 3. If the ion exchange membrane 8 is an anion exchange membrane, the cationic groups fixed to the anion exchange membrane do not allow cations in the electrolyte to move to the air electrode 6. In contrast, the hydroxide ions generated by the air electrode 6, which are anions, can move into the electrolyte. This allows the cell reaction of the metal-air cell 45 to proceed while not allowing the cations in the electrolyte 3 to move to the air electrode 6. This reduces precipitation of metals and carbonates on the air electrode 6.

The ion exchange membrane 8 also reduces an excess supply of water from the electrolyte to the air electrode 6.

Examples of ion exchange membranes 8 include solid polymer electrolyte membranes (anion exchange membranes) made of polymers such as perfluorosulfonic acid polymers, perfluorocarboxylic acid polymers, styrene-vinylbenzene polymers, and quaternary ammonium polymers.

If the air electrode 6 is disposed in contact with the ion exchange membrane 8, the air electrode 6 may be formed on the ion exchange membrane 8, and it may be held between the electrolyte cell 1 and the current-collecting member 25, for example, as shown in FIGS. 1 and 6.

REFERENCE SIGNS LIST 1 electrolyte cell
3 electrolyte
4 electrode active material part
5 metal electrode
6 air electrode
8 ion exchange membrane
10 current collector
11 supporting part
12 receiving part
13 projection
15 piece of electrode active material
16 fitting member
17 lid member
25 current-collecting member
26 air channel
28 spacer
31 bolt
32 nut
45 metal-air cell
101 zinc electrode
103 alkaline electrolyte
105 air electrode
106 anion exchange membrane
108 piece of metallic zinc

The invention claimed is:

1. A metal-air cell comprising an electrolyte cell containing an electrolyte, a metal electrode disposed in the electrolyte cell and serving as an anode, and an air electrode serving as a cathode,
   the metal electrode comprising a current collector and an electrode active material part disposed on the current collector, the electrode active material part comprising an electrode active material,
   the current collector comprising a supporting part supporting the electrode active material part and a receiving part disposed between a bottom of the electrolyte cell and the electrode active material part,
   the receiving part comprising a projection projecting in the electrolyte cell beyond a side surface of the electrode active material part toward a sidewall of the electrolyte cell,
   wherein the supporting part is plate-shaped and has an end detachably fixed to the receiving part.

2. The metal-air cell according to claim 1, wherein the receiving part is provided such that the projection receives a piece of the electrode active material falling off the electrode active material part.

3. The metal-air cell according to claim 1, wherein the receiving part is fixed to the electrolyte cell.

4. The metal-air cell according to claim 1, wherein the receiving part is provided so as to accommodate a piece of the electrode active material falling off the electrode active material part.

5. The metal-air cell according to claim 1, wherein
   the supporting part is plate-shaped, and
   the electrode active material part is disposed on first and second main surfaces of the supporting part.

6. The metal-air cell according to claim 1, wherein the supporting part and the receiving part each comprise a metal plate.

7. The metal-air cell according to claim 1, wherein
   the supporting part comprises a metal plate, and
   the receiving part comprises a metal mesh.

8. The metal-air cell according to claim 1, wherein the electrode active material is metallic zinc, metallic calcium, metallic magnesium, metallic aluminum, metallic iron, metallic lithium, or metallic sodium.

9. The metal-air cell according to claim 1, wherein the metal electrode is provided so as to be insertable into and removable from the electrolyte cell.

10. The metal-air cell according to claim 1, further comprising an ion exchange membrane disposed between the metal electrode and the air electrode,
    the ion exchange membrane having a main surface in contact with the electrolyte contained in the electrolyte cell and another main surface in contact with the air electrode.

11. A metal electrode comprising a current collector and an electrode active material part disposed on the current collector, the electrode active material part comprising an electrode active material,
    the current collector comprising a supporting part supporting the electrode active material part and a receiving part disposed at a lower end of the supporting part,
    the receiving part comprising a projection projecting beyond a side surface of the electrode active material part,
    wherein the supporting part is plate-shaped and has an end detachably fixed to the receiving part.

12. The metal electrode according to claim 11, wherein a gap is defined between the electrode active material part and the receiving part.

13. The metal electrode according to claim 11, wherein the receiving part supports the electrode active material part.

* * * * *